United States Patent
Wang

(10) Patent No.: US 7,215,767 B2
(45) Date of Patent: May 8, 2007

(54) FIXED BASE ASSEMBLY OF MOBILE PHONE

(76) Inventor: Chin Yang Wang, No. 24-110, Shao An Tsu, Pai Ho Town, Tainan Hsien (TW)

( * ) Notice: Subject to any disclaimer, the term of this patent is extended or adjusted under 35 U.S.C. 154(b) by 668 days.

(21) Appl. No.: 10/759,056

(22) Filed: Jan. 20, 2004

(65) Prior Publication Data

US 2005/0157868 A1    Jul. 21, 2005

(51) Int. Cl.
*H04M 1/00* (2006.01)
*H04M 9/00* (2006.01)

(52) U.S. Cl. ............. 379/455; 379/428.01; 455/575.9; 455/345

(58) Field of Classification Search ................ 379/455, 379/428.01, 428.02, 428.03, 428.04, 449, 379/454; 455/346, 575.9, 345
See application file for complete search history.

(56) References Cited

U.S. PATENT DOCUMENTS 6,134,421 A * 10/2000 Lee et al. ................ 455/575.9
6,647,248 B1 * 11/2003 Ortscheid et al. ........... 224/255
7,092,521 B2 * 8/2006 Wang ......................... 379/455
2004/0086112 A1 * 5/2004 Hilger et al. ............... 379/455

* cited by examiner

*Primary Examiner*—Curtis Kuntz
*Assistant Examiner*—Phylesha Dabney
(74) *Attorney, Agent, or Firm*—Bacon & Thomas, PLLC

(57) ABSTRACT

The present invention is to provide a fixed base assembly of mobile phone, which comprises a base having a cylinder at its center, a hollow at its bottom being connected to the cylinder such that the base is sheathed into a pillar at the center of a sucking disc, a spring surrounding the periphery of the pillar such that the base can expand and contract along the pillar and allowing a rotary member to be disposed on the cylinder and an extended position of the base, a flange substantially having a wave-shaped height and being symmetrical along the periphery, such that the two flanges respectively having a wave valley and a wave peak, a peg being used to be inserted into a pair of corresponding rectangular apertures of the cylinder to pivotally couple the sucking disc pillar, rotary member, and base, and both ends of the peg being exposed from the flange.

5 Claims, 5 Drawing Sheets

FIXED BASE ASSEMBLY OF MOBILE PHONE

BACKGROUND OF THE INVENTION

I. Field of the Invention

This invention relates to a fixed base assembly of mobile phones.

II. Description of the Prior Art

In the fast changing and highly efficient environment nowadays, electronic communications products (such as a mobile phone) have become a convenient and efficient communications tool. Since mobile phones are usually placed at a position according to the user's need (such as being hung at the user's waist or neck, or put in a backpack, a bag, or a car, etc.) and such position varies with the actual situation, therefore, it generally requires a fixed base to fix the mobile phone. In the example of putting the mobile phone in a car, the mobile phone is clamped and fixed to one end of a clamping base of the fixed device, and the other end of the fixed device is disposed at an appropriate position in the car, so that the driver can feel relieved and concentrate on driving.

However, since there are various designs for the fixed device of mobile phones in the market, therefore a prior-art fixed device which can be attached onto any fixed object in the car (such as a drink holder or a car window, etc) is used for example. Please refer to FIGS. 1 and 2 for the prior-art fixed device. Such fixed device 10 has a base 11 which is a cone symmetrical along the circumference and comprises a hollow cylinder 12 extended upward from the center of the top of the base 11, and a pair of corresponding small and large apertures 121, 122 respectively extended upward from the cylinder 12 and the cone, and the bottom of the cone is hollow, and a stop rod 123 is disposed at the bottom of the large aperture 122 in the cylinder 12 (as shown in FIG. 2).

Further, the hollow of the bottom of the cone allows the base 11 to be movably coupled to a sucking disc 13, and the diameter of the sucking disc 13 is slightly larger than or equal to the external diameter of the bottom of the base 11. A bar-shaped pillar is extended upward from the center of the bar-shaped pillar 131, and a channel 132 is disposed on the pillar 131 such that the stop rod 123 in the bottom of the base 11 can be guided into the channel 132 to successfully slide the base 11 onto the sucking disc 13 (as shown in FIG. 2), and the outer periphery of the bar-shaped pillar 131 is surrounded by a spring 133.

Further, there is a clicking member 14, which has a head section 141 to be extended into the large aperture 122 of the cylinder 12 and the channel 132 of the pillar 131 of the sucking disc 13, and pivotally coupled to the small aperture 121 by a peg 15. One end of the cylinder 12 of the base 11 is coupled to a connecting rod 16, and the other end of the connecting rod 16 is disposed on a clamping base 161 which is used for clamping the mobile phone.

Therefore, if the exposed end 142 of the clicking member 14 is pressed as shown in FIG. 2, the head section 141 presses against the stop rod 123 to compress the spring 133 such that the hollow at the bottom of the base 11 presses on the sucking disc 13 to constitute a vacuum and attaches the bottom of the base 11 onto the sucking disc 13 tightly. The sucking disc 13 will contract inward as the hollow at the bottom of the base 11 is attached by the sucking disc 13 and the sucking disc is further attached securely onto any fixed object 17 in the car. On the other hand, if the exposed end 142 of the clicking member 14 is lifted such that after the force of the head sections 141 pressing against the stop rod 123 is gone, the bottom of the base 11 is lifted and separated from the sucking disc 13 due to the resilience of the spring 133. Therefore, the fixed device 10 can be removed successfully.

Although the way of using the base 11 and the sucking disc 13 of the fixed device 10 to work together with the clicking member 14 can attach the sucking disc 13 securely onto a fixed object 17 and fix the mobile phone onto another end of the fixed device 10, the structures of the large aperture 122 on the cylinder 12 of the base 11, the stop rod 123 at the bottom and the sucking disc 13 of the pillar 131, the channel 132 on the pillar 131, and the clicking member 14, etc not only are complicated, but also carry a high manufacturing cost, and make the overall assembling very complicated and laborious. Furthermore, the clicking member 14 will break easily when it has been used for a long time, and has the shortcomings of causing the base 11 unable to operate and to be attached to the sucking disc 13. Therefore, it has a poor stability which definitely affects the utility of the fixed device 10.

SUMMARY OF THE INVENTION

In view of the shortcomings of the aforementioned conventional fixed device which has a base, a sucking disc, and a clicking member, etc. on one end including the complicated structure, high mold manufacturing cost, overall complicated assembling procedure, easily broken clicking member, and inoperable base and sucking disc, etc, the inventor of the present invention based on years of experience and technologies in the mobile phone earphone industry, and conducted extensive researches and experiments to solve the problems and overcome the shortcomings, and finally invented the "Fixed base of mobile phone" in accordance with this invention. By this invention, the aforementioned shortcomings of the prior can be overcome.

The primary object of the invention is to provide a mobile phone fixed base with simple structure, easy-to-make mold, fast assembling, and low cost features. The fixed base comprises a base having a cylinder at the center of the base, a hollow at the bottom of the base being connected to the cylinder such that the base is sheathed into a pillar at the center of a sucking disc, a spring surrounding the periphery of the pillar such that the base can expand and contract along the pillar and allowing a rotary member to be disposed on the cylinder and an extended position of the base, a flange substantially having a wave-shaped height and being symmetrical along the periphery, such that the two flanges respectively have a wave valley and a wave peak, a peg being used to be inserted into a pair of corresponding rectangular apertures of the cylinder to pivotally couple the sucking disc pillar, rotary member, and base, and both ends of the peg being exposed from the flange. If the fixed base is fixed onto a fixed object, the rotary member is rotated to move both ends of the peg along the wave valley and wave peak of the flange, so that the bottom of the base presses against the sucking disc to constitute a vacuum condition and attaches the base onto the fixed object, or lifts the sucking disc to separate the sucking disc from the fixed object, or removes the fixed base from the fixed object.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 3:
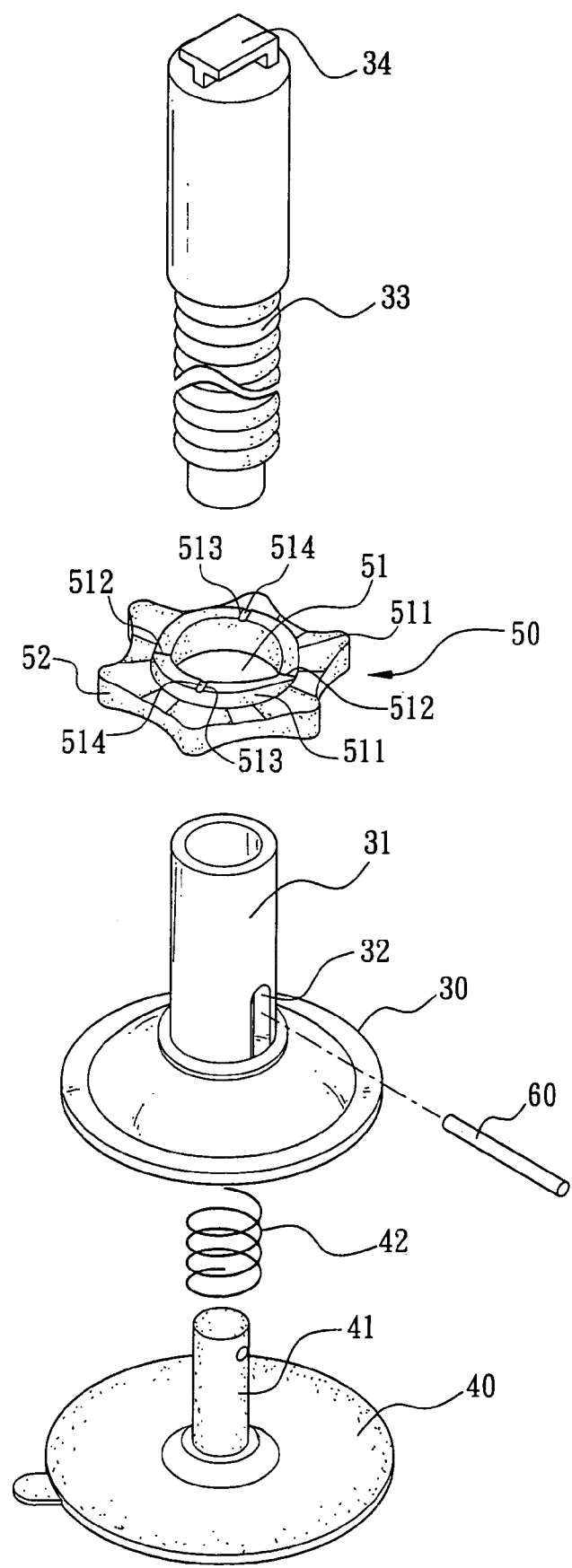
FIG. 3 is a perspective view of the disassembled parts of the structure of a fixed base according to the present invention.

Please refer to FIG. 3 for the fixed base assembly of the mobile phone according to the present invention. In FIG. 3, the fixed base comprises a base 30, a sucking disc 40, and a clicking member 50; wherein the base 30 is a cone symmetrical along the circumference; a hollow cylinder 31 is extended upward from the center of the top of the cone; a pair of corresponding rectangular through holes 32 is extended upward respectively from the cylinder 31 and an extended position of the cone; a hollow is disposed at the bottom of the cone (as shown in FIG. 4); the hollow and the cylinder 31 are interconnected; one end of the cylinder 31 of the base 30 is coupled to a connecting rod 33, and the other end of the connecting rod 33 has a clamping base 34, and the clamping base 34 is used to clamp the mobile phone (not shown in the figure).

Please refer to FIG. 3 again. The hollow at the bottom of the cone can slide the base 30 onto the sucking disc 40, and the external diameter of the sucking disc 40 is slightly greater than (or equal to) the external diameter of the bottom of the base 30. A bar-shaped pillar 41 is extended upward from the center of the sucking disc 40, such that the pillar 41 can be guided into the cylinder 31 more stably and securely from the hollow at the bottom of the base 30, and the base 30 can be slid and disposed successfully onto the sucking disc 40 (as shown in FIG. 4), and a spring 42 is sheathed around the periphery of the bar-shaped pillar 41 for a sliding movement by expansions and contractions.

Please refer to FIG. 3 again. A through hole 51 is disposed at the center of the rotary member 50, and has a size precisely sheathing the rotary member 50 into the cylinder 31 and an extended position of the cone. A symmetrical flange 511 is disposed on the periphery of the through hole 51, and the height of the flange 511 is substantially in the shape of waves and the connecting position of the symmetric wave forms of the two flanges 511 forms a wave valley 512 and a wave peak 513 at the center of the wave. In the meantime, a peg 60 is inserted into the pair of corresponding rectangular apertures 32 to pivotally couple the pillar 41 of the sucking disc 40, rotary member 50, and base 30, and both ends of the peg 60 are exposed from the flange 511.

Figure 4:
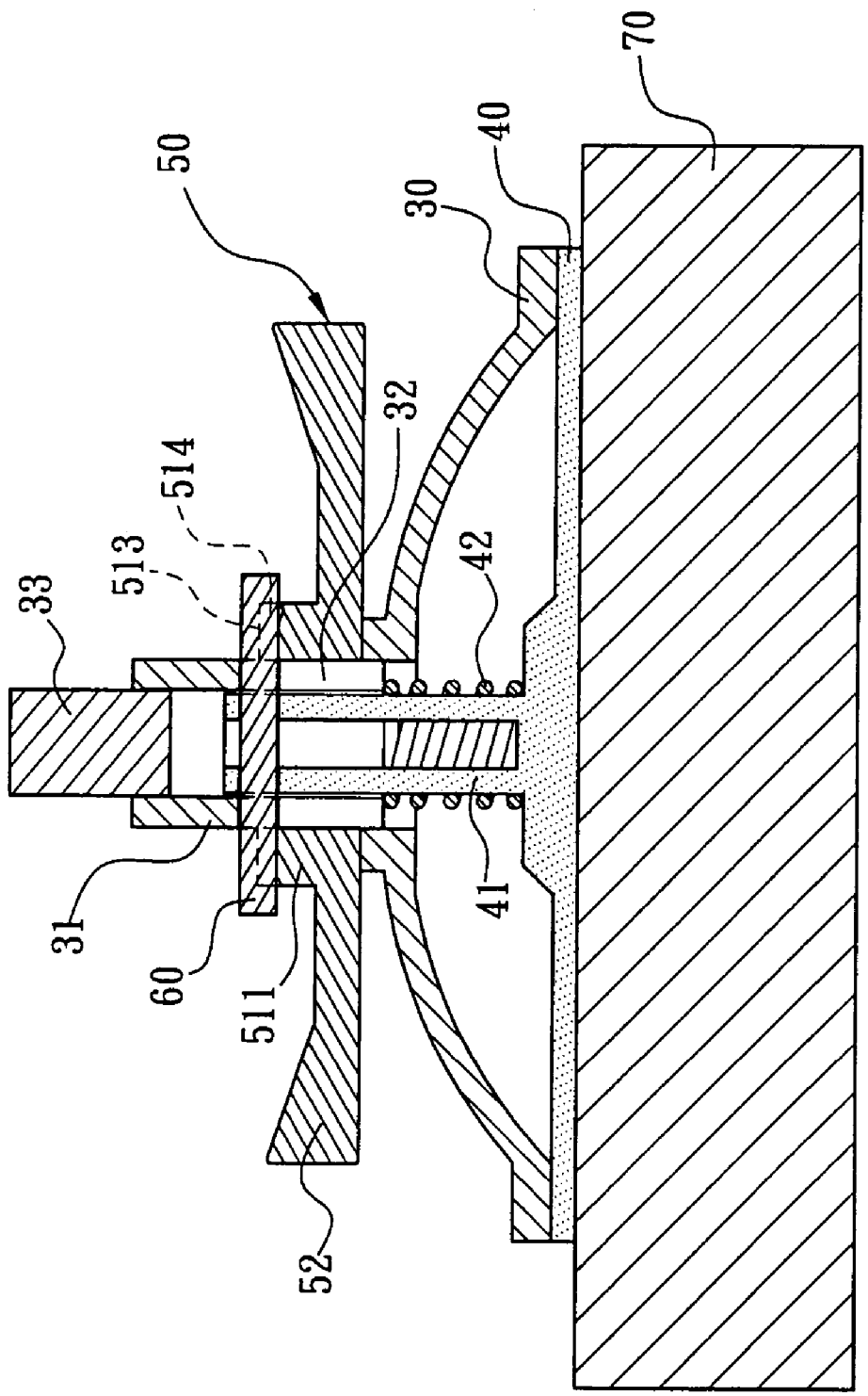
FIG. 4 is a cross-sectional view of the movements of part of the fixed base according to the present invention.

From the aforementioned assembly of components, it is known that when the fixed base is fixed onto a fixed object 70 (such as a cup holder, or a car window, etc), the extended section 52 of the rotary member 50 is rotated to lift both ends of the peg 60 along the wave-shaped flange 511 to the wave peak 513 and compress the spring 42 accordingly, so that the bottom of the base 30 presses against the sucking disc 40 to form a vacuum condition for attachment as shown in FIG. 4. The sucking disc 40 will contract inward when the hollow at the bottom of the base 30 is attached, and thus securely attach the bottom of the base 30 onto a fixed object 70.

Figure 5:
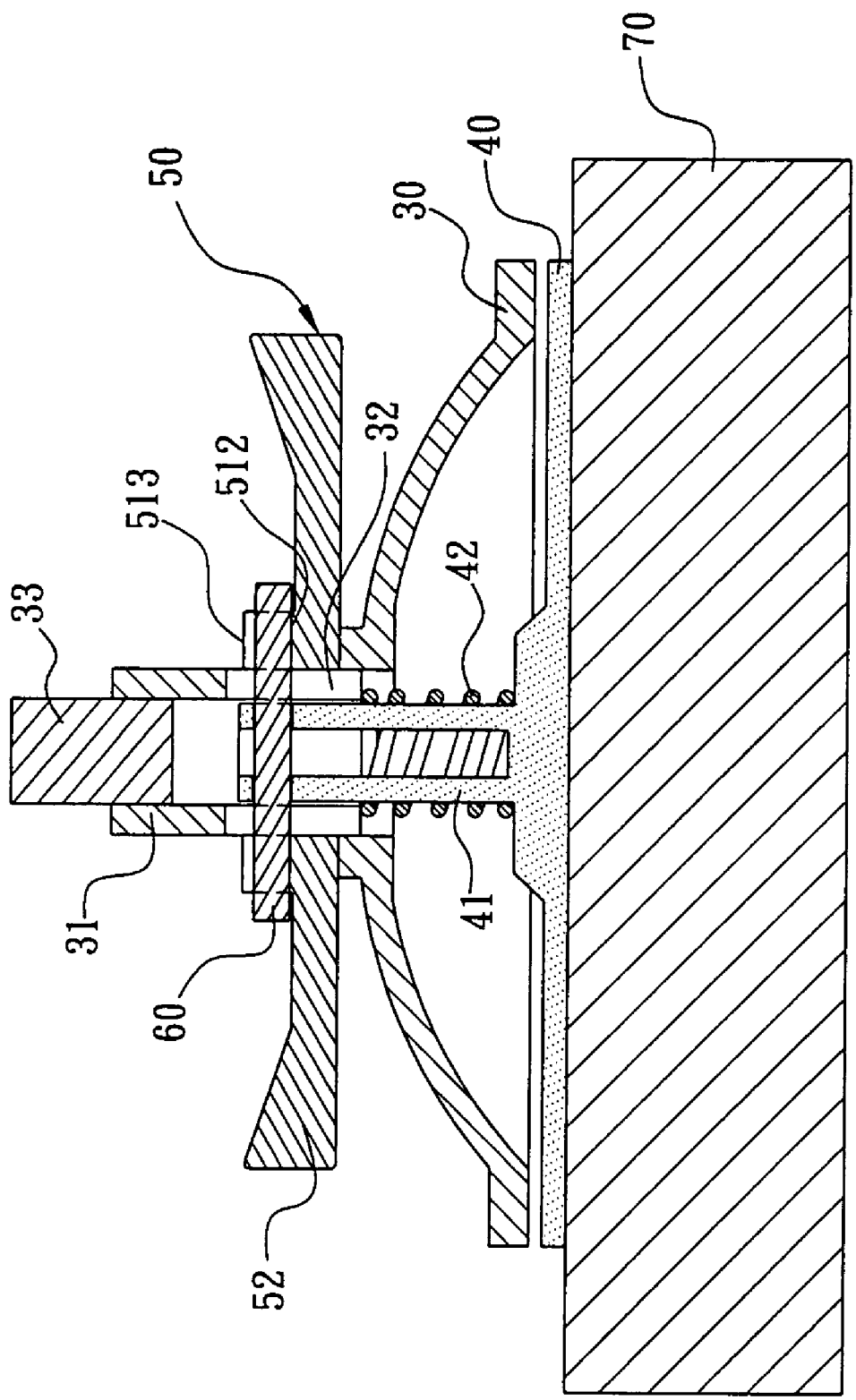
FIG. 5 is another cross-sectional view of part of the movements of the fixed base according to the present invention.

On the other hand, when the extended section 52 of the rotary member 50 is rotated, both ends of the peg 60 drop to the wave valley 512 from the wave-shaped flange 511. Since the compressed force is gone, the resilience of the spring 42 will lift the bottom of the base 30 and separate the bottom of the base 30 from the sucking disc 40 as shown in FIG. 5 to successfully remove the fixed base.

Please refer to FIG. 3 again for a preferred embodiment of the present invention. The external edge of the rotary member 50 is a polygonal extended section 52. However such design is not limited to the polygon shape in actual implementations. The shape of the external edge of the rotary member 50 could be of any shape such that the polygonal extended section 52 allows the user to rotate the rotary member 50 easily.

Further, in this embodiment, the wave peak 513 of the flange 511 of the rotary member 50 has a fixed groove 514 such that after the rotary member 50 is rotated, both ends of the peg 60 exposed from the flange 511 fall into the fixed groove 514 to securely position the peg 60, and allow users to have a definite feel about the section of the peg.

Figure 1:
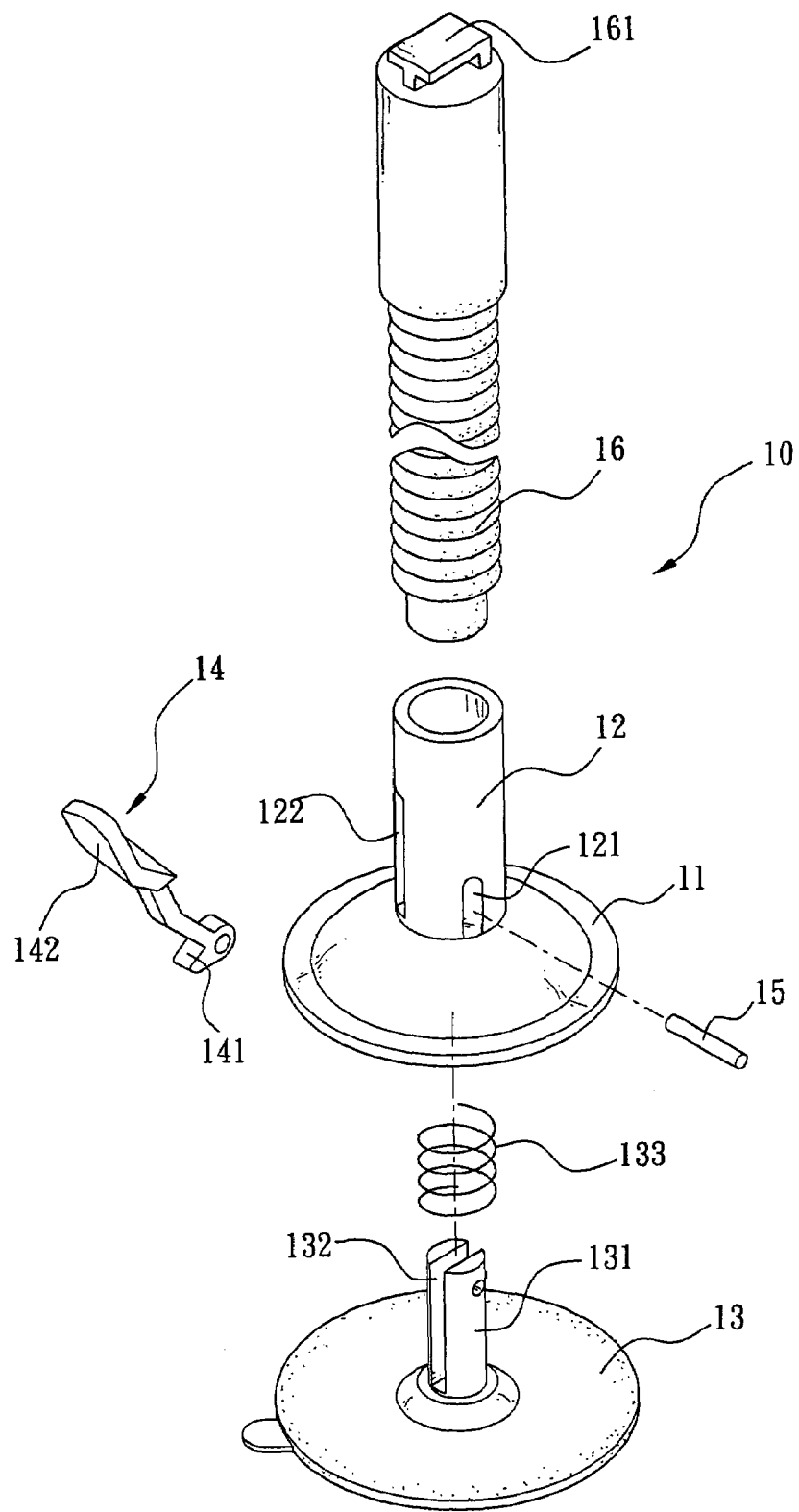
FIG. 1 is a perspective view of the disassembled parts of the structure of a prior-art fixed device.
Figure 2:
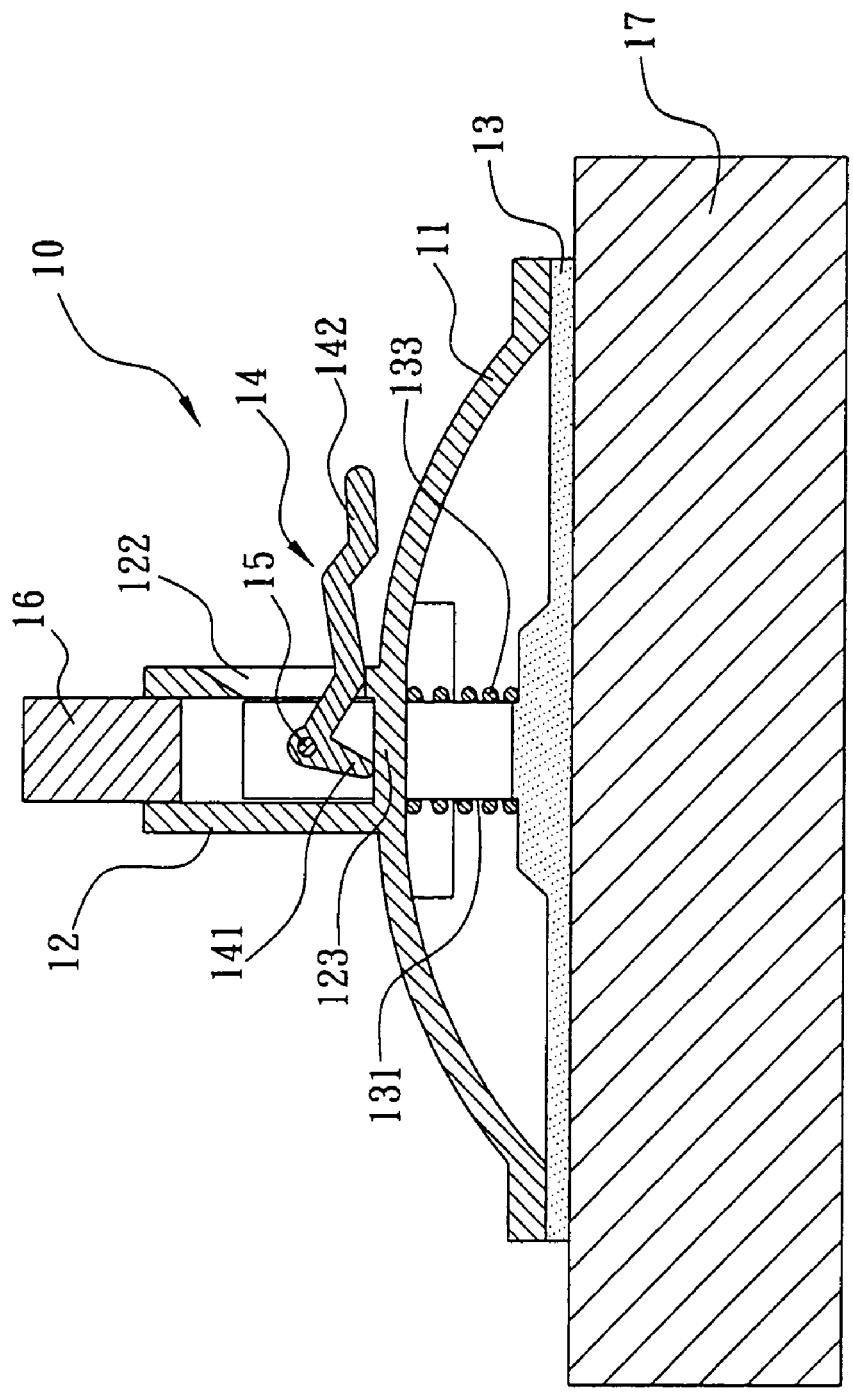
FIG. 2 is a cross-sectional view of part of a prior-art fixed device.

Therefore, in summation of the description above, the most significant feature of this invention resides on the simple design of the structures of the base 30, sucking disc 40, and rotary member 50, not only having the advantages of the easy-to-make mold, simple assembling, and low manufacturing cost, but also having a very strong structure of rotary member 50, which can prevent the cracking of the rotary member 50 as the traditional clicking member 14 (as shown in FIG. 1) usually breaks after being exerted with a larger clicking force and used for a long time. Thus, this invention can give the best using condition in a long-time use, and the design of this invention can effectively overcome the shortcomings of traditional device. Therefore, this invention is regarded a humanistic design.

What is claimed is:

1. A fixed base assembly of mobile phone, comprising:
   a base, having a hollow cylinder extended upward from the center of the top of said base, a pair of corresponding rectangular through holes being disposed respectively at an extended position of said cylinder and base, such that the bottom of said base being a hollow, and said hollow and said cylinder being interconnected, and the top of said cylinder being coupled to a connecting rod, and one end of said connecting rod being used for clamping a mobile phone;
   a sucking disc, having an external diameter slightly larger than or equal to the external diameter of the bottom of said base, and a bar-shaped pillar being extended upward from the center of said sucking disc for being guided into said cylinder from the hollow of said base, such that said base being slidably disposed on said sucking disc, and a spring surrounding the periphery of said bar-shaped pillar, such that said base being capable of sliding by expanding and contracting up and down along said pillar;
   a rotary member, having a through hole at its center, and the size of said through hole precisely allowing said rotary member to be sheathed around said cylinder and an extended position of said base, and a symmetrical flange being disposed the circumference of said through hole, and the height of said flange being substantially in the shape of waves forming a wave valley at the connecting position of said symmetrical waves of said two flanges, and the center of said wave-shaped flange forming a wave peak, such that a peg being inserted into said two corresponding rectangular apertures to pivotally couple said pillar of said sucking disc, said rotary member, and said base, and both ends of said peg being exposed from said flange.

2. The fixed base assembly of mobile phone of claim 1, wherein said rotary member having a polygonal extended section for facilitating the rotation of said rotary member.

3. The fixed base assembly of mobile phone of claim 1, wherein said rotary member at the flange of its wave peak comprises a fixed groove for dropping both ends of said peg exposed from said flange after said rotary member is rotated to secure the position of said peg and give a definite feel about the section of said peg.

4. The fixed base assembly of mobile phone of claim 1, wherein said base is a cone symmetrical along the circumference.

5. The fixed base assembly of mobile phone of claim 1, wherein said connecting rod at the other end is coupled to a clamping base for clamping a mobile phone.

* * * * *